United States Patent
Marking et al.

(10) Patent No.: US 7,449,129 B2
(45) Date of Patent: Nov. 11, 2008

(54) CE,PR-COACTIVATED STRONTIUM MAGNESIUM ALUMINATE PHOSPHOR AND LAMP CONTAINING SAME

(75) Inventors: Gregory A. Marking, Sayre, PA (US); Thomas M. Snyder, Laceyville, PA (US)

(73) Assignee: Osram Sylvania Inc., Danvers, MA (US)

( * ) Notice: Subject to any disclaimer, the term of this patent is extended or adjusted under 35 U.S.C. 154(b) by 343 days.

(21) Appl. No.: 11/308,100

(22) Filed: Mar. 7, 2006

(65) Prior Publication Data

US 2007/0210283 A1    Sep. 13, 2007

(51) Int. Cl.
*C09K 11/64*    (2006.01)
*C09K 11/55*    (2006.01)
*H01J 1/62*    (2006.01)
*H01J 11/02*    (2006.01)
*H01J 61/16*    (2006.01)

(52) U.S. Cl. .............................. 252/301.4 R; 313/486; 313/643; 313/637

(58) Field of Classification Search .......... 252/301.4 R; 313/486, 643, 637
See application file for complete search history.

(56) References Cited

U.S. PATENT DOCUMENTS

| | | | |
|---|---|---|---|
| 4,499,403 A | 2/1985 | Leppelmeier et al. ....... | 313/487 |
| 4,933,600 A | 6/1990 | Endres ....................... | 313/487 |
| 4,959,551 A | 9/1990 | Schlitt ..................... | 250/504 R |
| 4,967,090 A | 10/1990 | Schlitt .................... | 250/504 R |
| 5,140,604 A * | 8/1992 | Alablanche et al. .......... | 372/41 |
| 5,216,323 A | 6/1993 | Baaten et al. ............... | 313/487 |
| 5,234,710 A | 8/1993 | Dutta et al. .................. | 427/67 |
| 5,571,451 A | 11/1996 | Srivastava et al. ..... | 252/301.4 R |
| 6,246,171 B1 | 6/2001 | Vollkommer et al. ....... | 313/586 |
| 6,398,970 B1 | 6/2002 | Jüstel et al. ................. | 210/748 |
| 6,469,435 B1 | 10/2002 | Seibold et al. ............. | 313/493 |
| 6,566,810 B1 | 5/2003 | Seibold et al. ............. | 313/582 |
| 6,613,248 B2 | 9/2003 | Setlur et al. ........... | 252/301.4 R |
| 6,984,931 B2 | 1/2006 | Dutta et al. ................. | 313/487 |
| 2003/0011310 A1 | 1/2003 | Juestel et al. ............... | 313/640 |

OTHER PUBLICATIONS

A. Srivastava et al., Luminescence of $Pr^{3+}$ in $SrAl_{12}O_{19}$: Observation of two photon luminescence in oxide lattice, *J. Luminescence*, 71 (1997) 285-290.

* cited by examiner

*Primary Examiner*—C. Melissa Koslow
(74) *Attorney, Agent, or Firm*—Robert F. Clark

(57) ABSTRACT

A $Sr(Al,Mg)_{12}O_{19}$:Ce,Pr phosphor is described wherein the phosphor has an increased sensitivity to excitation by 185 nm radiation compared to a $Sr(Al,Mg)_{12}O_{19}$:Ce phosphor. The Ce,Pr-coativated strontium magnesium aluminate phosphor emits ultraviolet (UV) radiation at about 306 nm in the UVB region. Suntan lamps made with this phosphor exhibit improved performance over lamps made with a commercial $Sr(Al,Mg)_{12}O_{19}$:Ce phosphor.

16 Claims, 4 Drawing Sheets

CE,PR-COACTIVATED STRONTIUM MAGNESIUM ALUMINATE PHOSPHOR AND LAMP CONTAINING SAME

TECHNICAL FIELD

This invention relates to UV-emitting phosphors and lamps containing UV-emitting phosphors. More particularly, this invention relates to strontium magnesium aluminate phosphors and suntan lamps containing same.

BACKGROUND OF THE INVENTION

Ultraviolet (UV)-emitting phosphors are used in fluorescent lamp applications for skin tanning where both UVA and UVB radiation is needed. UVA is defined by the U.S. Food & Drug administration (FDA) as radiation from 320 nm to 400 nm and UVB is defined as radiation from 260 nm to 320 nm. The allowable levels of UVB radiation emitted by suntan lamps is tightly controlled and the use of various UV-emitting phosphor blends to control the proportions of UVA to UVB radiation is well known. Examples of such UV-emitting blends are disclosed in U.S. Pat. Nos. 4,959,551, 4,967,090, 5,216,323, 4,499,403, and 4,933,600.

A cerium-activated strontium magnesium aluminate phosphor, $Sr(Al,Mg)_{12}O_{19}$:Ce, is commonly used in suntan lamp applications to increase the amount of UVB radiation emitted by the lamp in order to improve the suntanning process. (See, e.g., U.S. Pat. Nos. 5,234,710 and 6,984,931). Typically, the amount of the $Sr(Al,Mg)_{12}O_{19}$:Ce phosphor ranges between 6% to 8% by weight (wt. %) of the phosphor blend, but it may comprise up to about 12 wt. % in some cases. The greater portion of the phosphor blend in suntan lamps emits UVA radiation and may comprise one or more of the known UVA-emitting phosphors such as $BaSi_2O_5$:Pb, $SrB_4O_7$:Eu, or $YPO_4$:Ce.

Suntan lamps are based on the conventional low-pressure mercury discharge prevalent in fluorescent lighting. The primary UV excitation energy emitted by a low-pressure mercury discharge is at 254 nm. However, a sizeable portion of the total UV radiation is also emitted at 185 nm. The amount of 185 nm radiation depends upon the fill gas composition and pressure of the lamp, but this can be as much as 8-10% of the total UV radiation. Unfortunately, the conventional $Sr(Al,Mg)_{12}O_{19}$:Ce phosphor is poorly excited by the 185 nm radiation, so that this energy is wasted with respect to this phosphor.

SUMMARY OF THE INVENTION

We have discovered that the sensitivity of the $Sr(Al,Mg)_{12}O_{19}$:Ce phosphor to 185 nm radiation may be increased by incorporating a praseodymium coactivator into the phosphor. The cerium and praseodymium coactivated strontium magnesium aluminate phosphor of this invention may be represented by the formula, $Sr(Al,Mg)_{12}O_{19}$:Ce,Pr. More preferably, the phosphor may be represented by the formula, $Sr_{1-x-y}Ce_xPr_yAl_{12-z}Mg_zO_{19}$, where x ranges from about 0.02 to about 0.15, y ranges from about 0.001 to about 0.05, and z ranges from greater than 0 to about 0.20. In a preferred embodiment, x ranges from about 0.06 to about 0.08 and y ranges from about 0.005 to about 0.0125. The molar amount of magnesium that substitutes for aluminum for charge balancing is preferably equal to the total molar amount of the activators, i.e., z=x+y. More preferably, there can be a slight excess of magnesium of up to about 0.02 moles Mg/mole phosphor above the amount needed for charge balancing thus z can range from x+y to x+y+0.02.

Because of its increased excitation at 185 nm, it should be possible to use lesser quantities of the $Sr(Al,Mg)_{12}O_{19}$:Ce,Pr phosphor in suntan lamp applications to yield the same amount of UVB emission. The relative proportion of the UVA-emitting phosphors would thus be increased and the overall UV light output of the lamp (UVA and UVB) would also be increased.

In the case of the $Sr(Al,Mg)_{12}O_{19}$:Ce phosphor, the amount of the $Ce^{3+}$ activator substituted for strontium at the $Sr^{2+}$ sites is counterbalanced by substituting a similar amount of $Mg^{2+}$ for aluminum at the $Al^{3+}$ sites resulting in an approximate charge balance. In addition to and beyond the benefit of charge balancing, the presence of an optimum $Mg^{2+}$ level in the phosphor lattice is thought to be necessary to maximize the UVB emission. Most of the 3+ rare earth ions have similar atomic and ionic radii, and thus it was anticipated that other of the 3+ rare earth ions could replace cerium in the phosphor lattice. When praseodymium is used instead of cerium as the activator, both the excitation and emission characteristics of the strontium magnesium aluminate phosphor are drastically changed as in, for example, the quantum-splitting phosphor $Sr(Al,Mg)_{12}O_{19}$:Pr which is described in U.S. Pat. Nos. 5,571,451 and 6,613,248 and U.S. application Ser. No. 11/160,052, filed Jun. 7, 2005. The Ce-activated phosphor is excited by 254 nm radiation, but not by 185 nm radiation, and emits at about 306 nm. The Pr-activated phosphor is not excited by 254 nm radiation, but is instead excited by vacuum ultraviolet (VUV) radiation (including 185 nm radiation) and emits primarily at about 275 nm. When both Pr and Ce are used as co-activators in this phosphor, the phosphor is excited by both 185 nm and 254 nm radiation and emits primarily in the UVB region. Presumably, the excited $Pr^{3+}$ sites transfer nearly all of their energy to the $Ce^{3+}$ sites, where it is emitted as UVB radiation at about 306 nm.

The $Sr(Al,Mg)_{12}O_{19}$:Ce,Pr phosphor may be prepared by thoroughly dry blending the appropriate metal oxides, hydroxides, carbonates, and halides, then firing the blended material in a reducing atmosphere, preferably 75% $H_2$-25% $N_2$, for a time and temperature sufficient to form the phosphor, preferably at least 1.5 hours at a temperature between about 1500° C. to about 1600° C. The fired material may be further processed with water and/or chemical washing and milling steps before it is dried and sifted. Chemical precipitation techniques may also be used to prepare a thorough mixture ready for firing in a reducing atmosphere.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
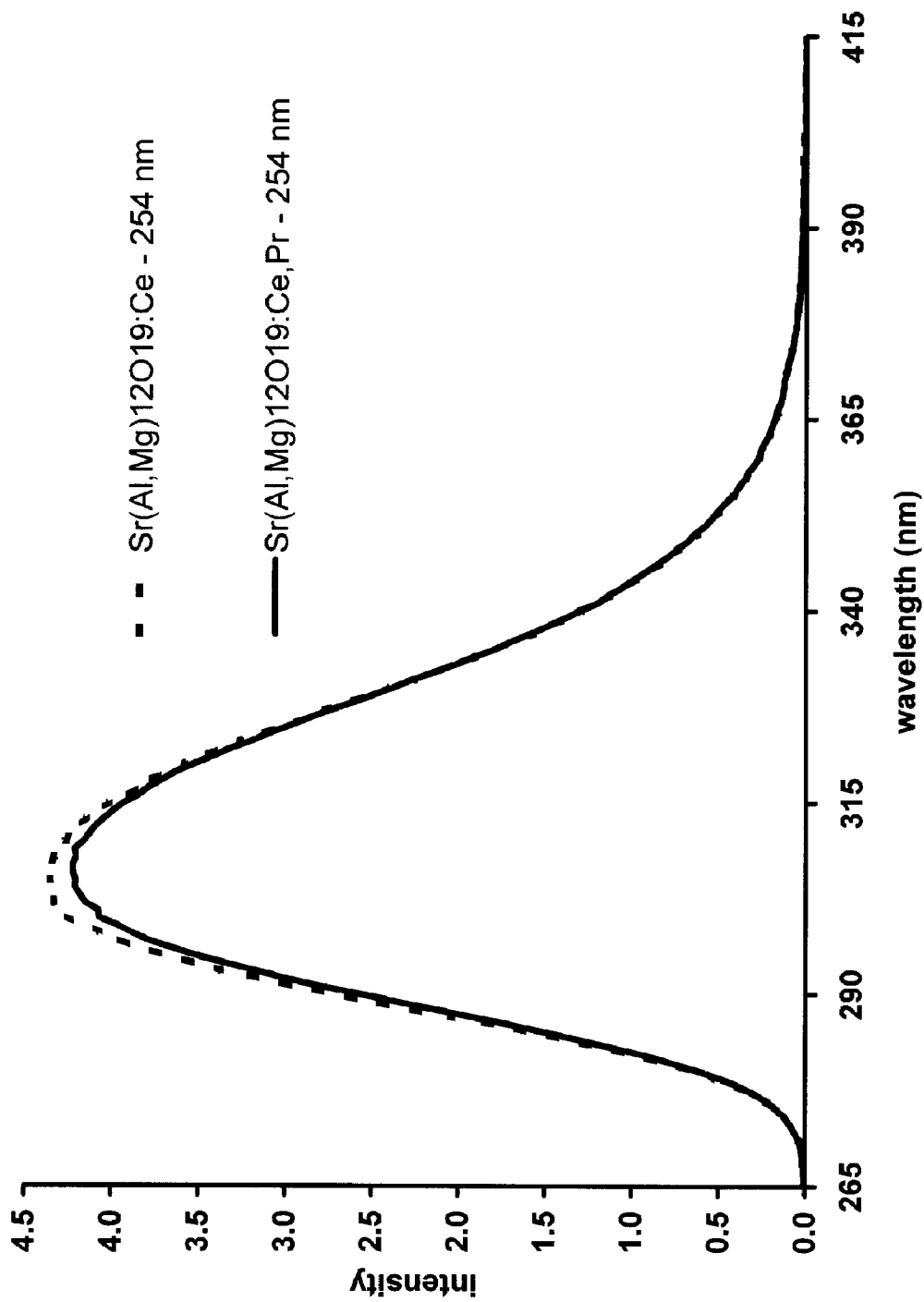
FIG. 1 shows the emission spectra between 265 nm and 415 nm of $Sr(Al,Mg)_{12}O_{19}$:Ce and $Sr(Al,Mg)_{12}O_{19}$:Ce,Pr phosphors under 254 nm excitation radiation.
Figure 2:
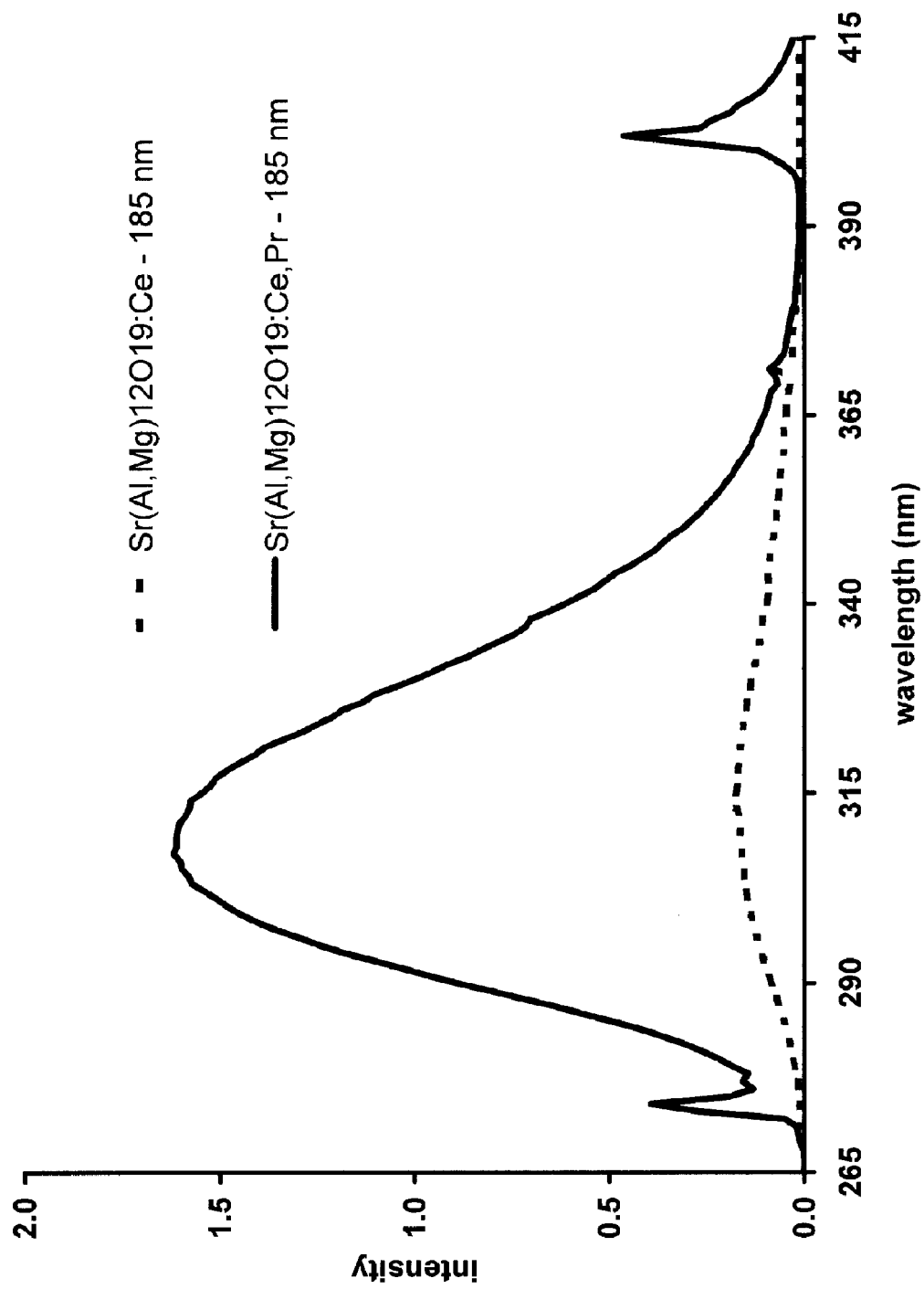
FIG. 2 shows the emission spectra between 265 nm and 415 nm of $Sr(Al,Mg)_{12}O_{19}$:Ce and $Sr(Al,Mg)_{12}O_{19}$:Ce,Pr phosphors under 185 nm excitation radiation.

UVB emission and excitation spectra of $Sr(Al,Mg)_{12}O_{19}$:Ce,Pr and $Sr(Al,Mg)_{12}O_{19}$:Ce phosphors were measured using an Acton SpectraPro-2500i monochromator/spectrograph with a deuterium light source and a VM-504 vacuum monochromator. FIG. 1 compares the UVB emission of the $Sr(Al,Mg)_{12}O_{19}$:Ce,Pr and $Sr(Al,Mg)_{12}O_{19}$:Ce phosphors under 254 nm excitation and FIG. 2 compares their UVB emissions under 185 nm excitation. It is readily apparent from both figures that $Pr^{3+}$ co-activation increases the sensitivity of the phosphor to 185 nm radiation while maintaining the phosphor's response to 254 nm radiation.

Figure 3:
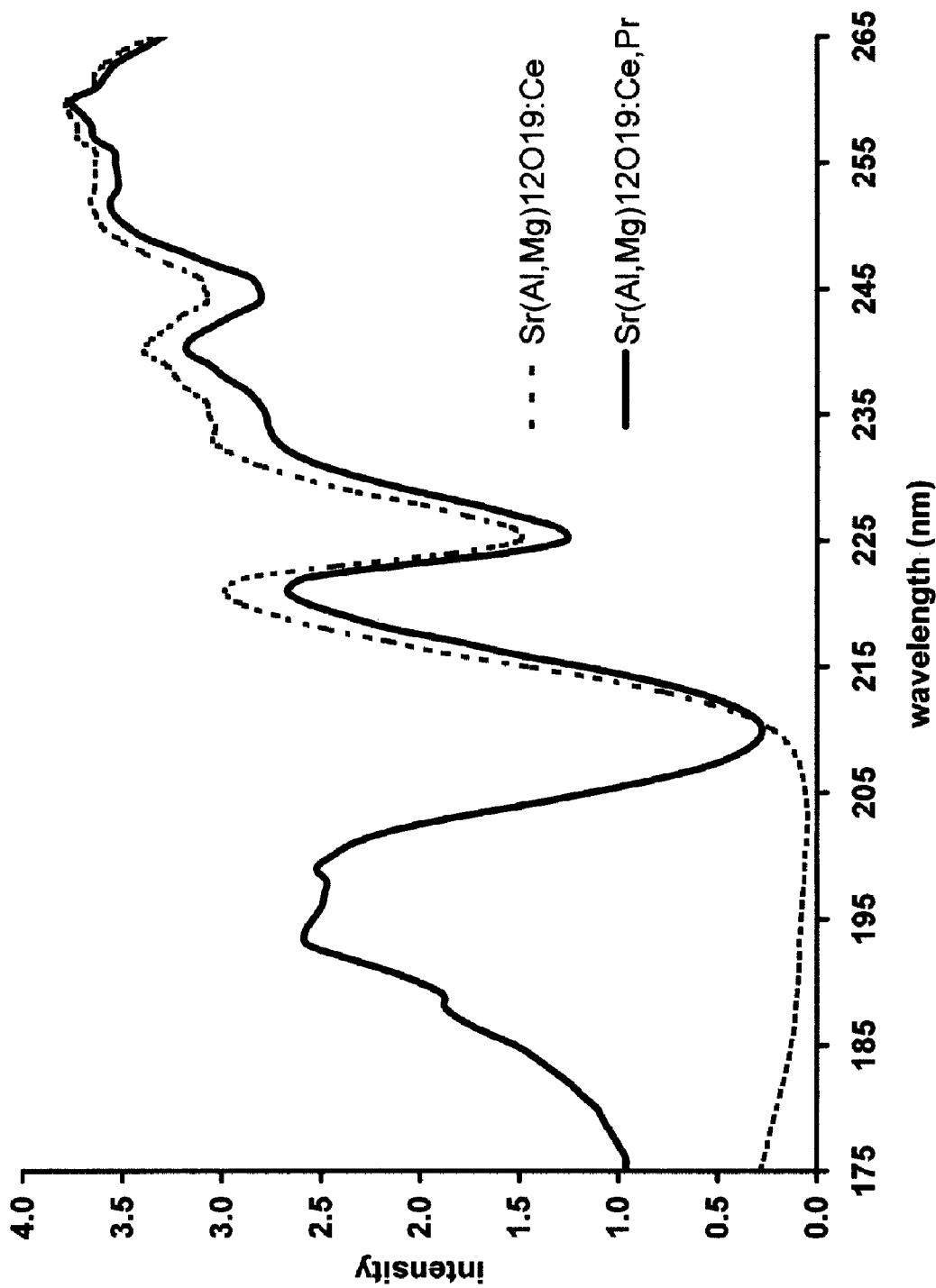
FIG. 3 compares the excitation spectra for the $Sr(Al,Mg)_{12}O_{19}$:Ce,Pr and $Sr(Al,Mg)_{12}O_{19}$:Ce phosphors.

A better view of the increased 185 nm sensitivity of the coactivated phosphor may be seen in FIG. 3 which shows the excitation spectra of the same phosphors measured for an emission at 304 nm (corrected relative to the excitation curve of a sodium salicylate standard). As expected from the response demonstrated in FIG. 2, the excitation curve for the coactivated $Sr(Al,Mg)_{12}O_{19}$:Ce,Pr phosphor exhibits a marked increase in intensity in the VUV region below about 200 nm compared to the singly activated $Sr(Al,Mg)_{12}O_{19}$:Ce phosphor which shows almost no response at these wavelengths. This confirms the enhanced sensitivity of the $Sr(Al,Mg)_{12}O_{19}$:Ce,Pr phosphor to 185 nm radiation.

EXAMPLES

A series of samples was prepared by weighing the appropriate quantities of strontium carbonate, strontium fluoride, magnesium oxide, aluminum hydroxide, cerium oxide, and praseodymium oxide, and then adding the reactants to 500 ml plastic bottles in which they were thoroughly blended via roll blending and paint shaking techniques. The mixtures were placed into alumina crucibles and fired in a continuous furnace at about 1550° C. for about two hours under a reducing atmosphere of 75% $H_2$/25% $N_2$. The samples were allowed to cool under the reducing atmosphere, removed and sifted −60 mesh.

Table 1 lists formulated molar compositions of the samples. Table 2 lists Pr and Ce levels (moles of activator/mole of phosphor) of the samples and the relative integrated intensity (Rel. Brightness) of their UVB emission under 185 nm and 254 nm radiation. A calculated total brightness is provided to simulate the performance of the phosphor under excitation with a low-pressure mercury discharge. This quantity was calculated by adding 8% of the 185 nm emission intensity to 92% of the 254 nm emission intensity. These percentages represent the approximate relative proportions of the UV radiation emitted by a low-pressure Hg discharge.

TABLE 1

Molar Formulations of $Sr(Al, Mg)_{12}O_{19}$: Ce, Pr Phosphor Samples

|  | $SrCO_3$ | $SrF_2$ | MgO | $Al(OH)_3$ | $CeO_2$ | $Pr_4O_7$ |
|---|---|---|---|---|---|---|
| Control | 0.6190 | 0.3098 | 0.083 | 11.917 | 0.082 | 0.00 |
| Sample 1 | 0.6315 | 0.3098 | 0.063 | 11.937 | 0.062 | 0.001875 |
| Sample 2 | 0.6265 | 0.3098 | 0.063 | 11.937 | 0.062 | 0.003125 |
| Sample 3 | 0.6265 | 0.3098 | 0.068 | 11.932 | 0.067 | 0.001875 |
| Sample 4 | 0.6215 | 0.3098 | 0.068 | 11.932 | 0.067 | 0.003125 |
| Sample 5 | 0.6190 | 0.3098 | 0.073 | 11.927 | 0.072 | 0.0025 |
| Sample 6 | 0.6190 | 0.3098 | 0.078 | 11.922 | 0.077 | 0.00125 |
| Sample 7 | 0.6165 | 0.3098 | 0.078 | 11.922 | 0.077 | 0.001875 |
| Sample 8 | 0.6115 | 0.3098 | 0.078 | 11.922 | 0.077 | 0.003125 |
| Sample 9 | 0.6140 | 0.3098 | 0.083 | 11.917 | 0.082 | 0.00125 |
| Sample 10 | 0.6115 | 0.3098 | 0.083 | 11.917 | 0.082 | 0.001875 |
| Sample 11 | 0.6090 | 0.3098 | 0.083 | 11.917 | 0.082 | 0.0025 |
| Sample 12 | 0.6065 | 0.3098 | 0.083 | 11.917 | 0.082 | 0.003125 |

TABLE 2

Integrated Emission Intensities of $Sr(Al, Mg)_{12}O_{19}$: Ce, Pr Phosphor Samples between 265 nm and 390 nm

| | Ce level | Pr level | Rel. Brightness under 254 nm | Rel. Brightness under 185 nm | Calculated Total Brightness |
|---|---|---|---|---|---|
| Control | 0.082 | 0 | 100% | 5% | 92% |
| Sample 1 | 0.062 | 0.0075 | 99% | 40% | 94% |
| Sample 2 | 0.062 | 0.0125 | 98% | 44% | 93% |
| Sample 3 | 0.067 | 0.0075 | 101% | 43% | 96% |
| Sample 4 | 0.067 | 0.0125 | 100% | 51% | 96% |
| Sample 5 | 0.072 | 0.01 | 100% | 48% | 96% |
| Sample 6 | 0.077 | 0.005 | 99% | 37% | 94% |
| Sample 7 | 0.077 | 0.0075 | 99% | 38% | 94% |
| Sample 8 | 0.077 | 0.0125 | 101% | 51% | 97% |
| Sample 9 | 0.082 | 0.005 | 100% | 32% | 94% |
| Sample 10 | 0.082 | 0.0075 | 101% | 35% | 95% |
| Sample 11 | 0.082 | 0.01 | 95% | 44% | 91% |
| Sample 12 | 0.082 | 0.0125 | 97% | 46% | 93% |

All of the inventive samples exhibited good UVB emission properties under both 254 nm and 185 nm exciting radiation. Moreover, almost all had a calculated total brightness which was greater than the Ce only-activated control indicating that the Ce,Pr-coactivated phosphor should exhibit better performance in a fluorescent lamp when excited with a low-pressure mercury discharge.

Figure 4:
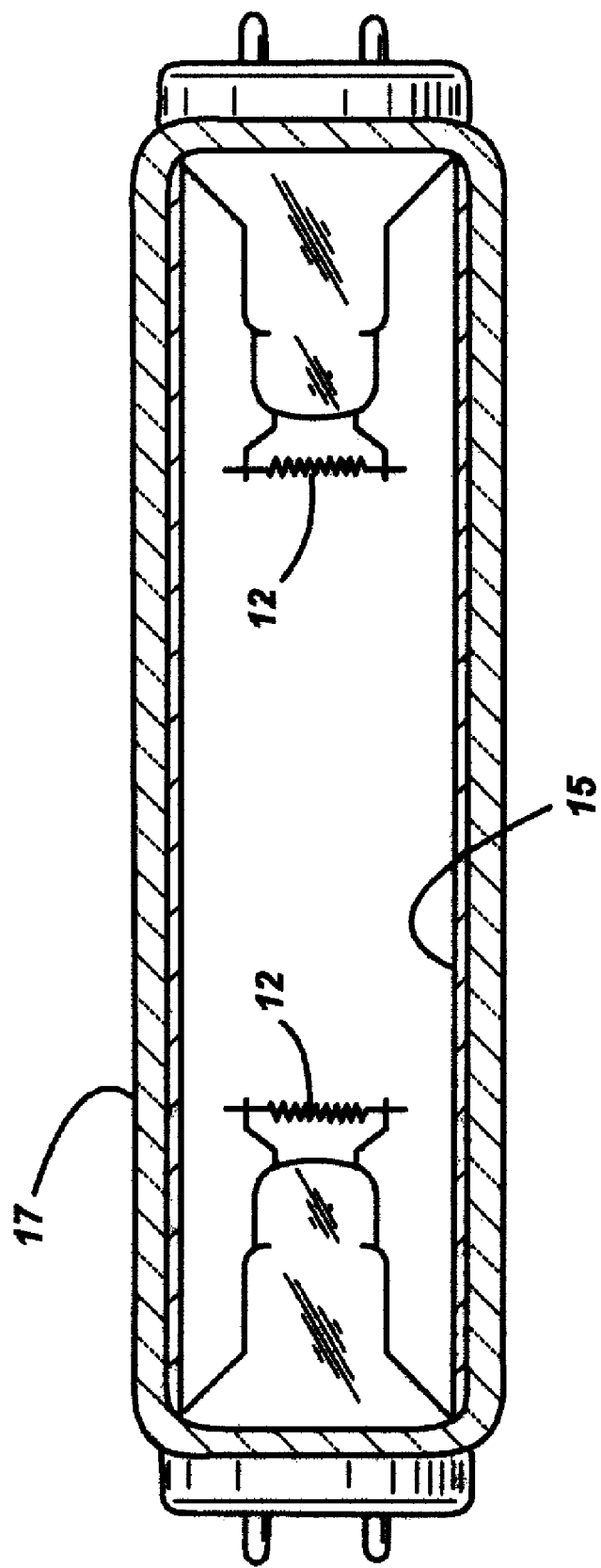
FIG. 4 is a cross-sectional illustration of a fluorescent lamp having a phosphor coating containing the $Sr(Al,Mg)_{12}O_{19}$:Ce,Pr phosphor.

FIG. 4 is a cross-sectional illustration of a fluorescent lamp having a phosphor coating containing the $Sr(Al,Mg)_{12}O_{19}$:Ce,Pr phosphor. The lamp has a hermetically sealed glass envelope 17. The interior of the envelope 17 is filled with an inert gas such as argon or a mixture of argon and krypton at a low pressure, for example 1-3 torr, and a small quantity of mercury, at least enough to provide a low vapor pressure (roughly 0.008 torr at 40° C.) during operation. An electrical discharge is generated between electrodes 12 to excite the mercury vapor to generate ultraviolet radiation. A phosphor coating 15 is applied to the interior surface of the envelope 17 to convert at least a portion of the ultraviolet radiation emitted by the low-pressure mercury discharge into a desired wavelength range. The phosphor coating 15 contains the $Sr(Al,Mg)_{12}O_{19}$:Ce,Pr phosphor which is stimulated by the ultraviolet radiation emitted by the discharge to emit ultraviolet radiation at about 306 nm.

Two groups of suntan lamps (eight lamps per group) were made using two similar UV-emitting phosphor blends. The blends represent a standard commercial blend for suntan lamps such as described in U.S. Pat. No. 6,984,931. One of the blends contained a commercial $Sr(Al,Mg)_{12}O_{19}$:Ce phosphor (OSRAM SYLVANIA Type 2096) and the other contained a $Sr(Al,Mg)_{12}O_{19}$:Ce,Pr phosphor having the same composition as sample 5. In each case, the strontium magnesium aluminate phosphors comprised about 6.5 wt. % of the blends. The remainder of the blends was comprised of $BaSi_2O_5$:Pb, $YPO_4$:Ce, and $SrB_4O_7$:Eu phosphors (OSRAM SYLVANIA Types 2011, 2040, and 2052, respectively).

Table 3 lists the average lamp data from those tests as a percentage of the values for the control group of lamps containing the commercial $Sr(Al,Mg)_{12}O_{19}$:Ce phosphor. The results indicate that the lamps containing the $Sr(Al,Mg)_{12}O_{19}$:Ce,Pr are equivalent or superior to the commercial $Sr(Al,Mg)_{12}O_{19}$:Ce material in Te, UVA emission, and UVB emission at both 0 hours and after 100 hours of operation. The quantity Te relates to tanning efficiency and the amount of time required to produce a tan. A lower Te, means less time is required to produce a tan, and is generally considered desirable.

TABLE 3

| | \multicolumn{6}{c}{Average Lamp Values Relative to Control Group} | | | | | |
|---|---|---|---|---|---|---|
| | 0 hr Te | 0 hr UVA | 0 hr UVB | 100 hr Te | 100 hr UVA | 100 hr UVB |
| Lamps containing Ce, Pr coactivated phosphor | 89% | 103% | 109% | 87% | 105% | 110% |
| Std Dev | 7% | 3% | 6% | 6% | 4% | 6% |

While there have been shown and described what are present considered to be the preferred embodiments of the invention, it will be apparent to those skilled in the art that various changes and modifications can be made herein without departing from the scope of the invention as defined by the appended claims.

What is claimed is:

1. A lamp comprising a glass envelope having a phosphor coating on an interior surface, the phosphor coating containing a UV-emitting phosphor comprising strontium magnesium aluminate activated with cerium and praseodymium.

2. The lamp of claim 1 wherein the UV-emitting phosphor is represented by a formula $Sr_{1-x-y}Ce_xPr_yAl_{12-z}Mg_zO_{19}$, where x ranges from about 0.02 to about 0.15, y ranges from about 0.001 to about 0.05, and z ranges from greater than 0 to about 0.20.

3. The lamp of claim 2 wherein x ranges from about 0.06 to about 0.08 and y ranges from about 0.005 to about 0.0125.

4. The lamp of claim 2 wherein z ranges from x+y to x+y+0.02.

5. The lamp of claim 4 wherein z equals x+y.

6. The lamp of claim 4 wherein x ranges from about 0.06 to about 0.08 and y ranges from about 0.005 to about 0.0125.

7. The lamp of claim 1 wherein the UV-emitting phosphor contains magnesium in an amount up to about 0.02 moles Mg/mole phosphor greater than the sum of the number of moles of praseodymium and cerium per mole of the UV-emitting phosphor.

8. A lamp comprising a glass envelope having a phosphor coating on an interior surface, the envelope being hermetically sealed and containing an amount of mercury and an inert gas, and the phosphor coating containing a UV-emitting $Sr(Al,Mg)_{12}O_{19}$:Ce,Pr phosphor.

9. The lamp of claim 8 wherein the envelope is tubular and has electrodes at opposite ends, the electrodes generating an electrical discharge during lamp operation whereby mercury vapor in the lamp is excited to generate ultraviolet radiation.

10. The lamp of claim 9 wherein the phosphor coating additionally contains at least one UVA-emitting phosphor.

11. A lamp comprising a glass envelope having a phosphor coating on an interior surface, the envelope being hermetically sealed and containing electrodes, an amount of mercury and an inert gas;
the electrodes generating an electrical discharge during lamp operation whereby mercury vapor in the lamp is excited to generate ultraviolet radiation; and
the phosphor coating containing a UV-emitting phosphor represented by a formula $Sr_{1-x-y}Ce_xPr_yAl_{12-z}Mg_zO_{19}$, where x ranges from about 0.02 to about 0.15, y ranges from about 0.001 to about 0.05, and z ranges from greater than 0 to about 0.20, the UV-emitting phosphor being stimulated by the ultraviolet radiation generated by the mercury vapor.

12. The lamp of claim 11 wherein x ranges from about 0.06 to about 0.08 and y ranges from about 0.005 to about 0.0125.

13. The lamp of claim 11 wherein z ranges from x+y to x+y+0.02.

14. The lamp of claim 13 wherein z equals x+y.

15. The lamp of claim 13 wherein x ranges from about 0.06 to about 0.08 and y ranges from about 0.005 to about 0.0125.

16. The lamp of claim 11 wherein the UV-emitting phosphor contains magnesium in an amount up to about 0.02 moles Mg/mole phosphor greater than the sum of the number of moles of praseodymium and cerium per mole of the UV-emitting phosphor.

* * * * *